United States Patent [19]

Garnweidner

[11] Patent Number: 5,090,755
[45] Date of Patent: Feb. 25, 1992

[54] IMPACT ABSORBER, ESPECIALLY AS A VEHICLE BUMPER SUPPORT

[75] Inventor: Peter Garnweidner, Lamprechtshausen, Austria

[73] Assignee: Austria Metall Aktiengesellschaft, Braunau am Inn, Austria

[21] Appl. No.: 721,720

[22] Filed: Jun. 25, 1991

[30] Foreign Application Priority Data

Jun. 25, 1990 [AT] Austria .................................. 1349/90

[51] Int. Cl.$^5$ .............................................. B60R 19/34
[52] U.S. Cl. ................................... 293/133; 188/375; 188/376
[58] Field of Search ................. 293/132, 133; 188/371, 188/375, 376

[56] References Cited

U.S. PATENT DOCUMENTS 2,557,105  6/1951  Hight ................................ 293/133 X
3,893,726  7/1975  Strohschein ....................... 293/133 X

FOREIGN PATENT DOCUMENTS 1105404  12/1955  France ................................. 188/375

Primary Examiner—Dennis H. Pedder
Attorney, Agent, or Firm—Herbert Dubno

[57] ABSTRACT

An impact absorber between a bumper and the base of a vehicle has ribs which progressively shear away against the flange during impact, this flange being originally connected and in one piece with the cylindrical body formed with the ribs and being separated therefrom by a weakened zone defined by an annular groove or notch formed in the weakened zone opposite the end of the body connected to the bumper.

11 Claims, 2 Drawing Sheets

014;090,755

IMPACT ABSORBER, ESPECIALLY AS A VEHICLE BUMPER SUPPORT

FIELD OF THE INVENTION

My present invention relates to an impact absorbing body, especially for motor vehicles, which can be utilized to dissipate energy of impact. More particularly, the invention relates to a body which can be interposed between the bumper of a motor vehicle and the vehicle frame or chassis.

BACKGROUND OF THE INVENTION

To protect persons in a motor vehicle against injury as a result of an impact by the motor vehicle against an object or the impact from another motor vehicle, it is common practice to provide an impact absorbing body or element between the bumper of the motor vehicle and the chassis or support frame thereof.

During an accident involving an impact, it is generally desirable and advantageous that the vehicle reduce its speed over the entire collision process to minimize the danger to persons within the vehicle. In other words the process of impact absorption should be substantially continuous over the entire collision process. For this purpose the strength reserve of the body of the vehicle should be fully utilized from the very beginning of the collision. This means that the deformation resistance from the beginning of the collision should be as high as possible to allow the greatest deformation work to be required from the inception of the collision.

This, of course, means that a substantially constant resistance force should be provided against the force of collision and in part the impact attenuator interposed between a bumper and the vehicle chassis supplies this function. There are various bumper supports which, in part by their deformation work, serve to maintain this constant force. Similar systems are provided also in the steering columns of the automotive vehicle. A major drawback of earlier energy absorbing or constant force supports for this purpose is that they generally are composed of a plurality of parts and thus must be assembled for use.

OBJECTS OF THE INVENTION

It is, therefore, the principal object of the present invention to provide a one-piece support or body for use as an impact absorber or as a constant-force impact element, especially between the bumper of an automotive vehicle and the vehicle body, but also for use, if desired, in the steering column of an automotive vehicle.

Another object of this invention is to provide an energy absorbing element which obviates the drawbacks enumerated above.

SUMMARY OF THE INVENTION

These objects and others which will become apparent hereinafter are attained, in accordance with the invention in an impact absorbing body capable of generating a substantially constant resistance to compaction on collision which is formed in one piece and consists essentially of an elongated generally cylindrical basic body or member which is formed with a region having generally radially projecting peripheral ribs, this region being disposed between an end of the body connectable to the bumper or a portion of the steering column which is to collapse on impact, and another end of which is provided with a circumferential flange or bracket. The transition region between the flange or bracket and the cylindrical body is defined by a circumferential groove or notch, forming a preferential-rupture zone at the side of the body opposite that at which the bumper or collapsible portion of the steering column is mounted.

This body can be mounted between the bumper and the motor vehicle chassis in a simple fashion since the means for attaching the bumper can be a flange at the first mentioned end of the cylindrical body while the other flange or bracket can be affixed to the vehicle chassis. The impact absorbing element of the invention functions by rupture of the weakened zone defined by the groove or notch, upon impact, whereupon with further compaction of the unit successive ribs are pressed against the flange liberated by the rupture and are themselves sheared away. This successive rib shearing provides a substantially constant compaction force over the entire compaction path of the support body.

The impact resisting body of the invention eliminates the disadvantage of earlier systems and, since it is formed in one piece, can be easily mounted. It need not be assembled before use and, because it is a one piece structure it is inexpensive to fabricate, e.g. by die casting.

In the case of minor collisions, it is simple to replace the impact resisting body and thus the repair cost is minimal.

According to a feature of the invention, the cylindrical member extends longitudinally passed and through the flange or bracket beyond the circumferential groove or notch. When the impact resistor of the invention is mounted in a longitudinal girder of the automotive vehicle, this extended portion of the cylindrical body provides additional guidance against undesired canting in the event of an eccentric load.

It has been found to be advantageous, moreover, to form the flange or bracket having the groove or notch with a ring-shape formation that extends along the cylindrical body. This cylindrical formation forms a guide for the extension of the cylindrical body which also contributes to guidance of the latter and prevents its tilting under eccentric load within the longitudinal girder of the chassis in a hollow thereof in a manner which might cause damage thereto.

The impact absorbing body can also be mounted on a transverse girder of the chassis or externally of the longitudinal girder.

To maintain its deformation resistance substantially constant over the entire deformation path, it is advantageous to orient the ribs on the cylindrical member at an acute angle to a respective plane normal to the longitudinal dimension of the impact absorbing body, i.e. an acute angle to a plane perpendicular to the axis of the cylindrical member.

With this inclination, a multiplicity of ribs can be involved in the deformation process, progressively shearing in a manner such that before one rib is fully sheared off a successive rib is encountered so that there will be a smooth force transition in the shearing of successive ribs. If the ribs would not be inclined and would lie normal to the longitudinal dimension, there would be a discontinuity in the resistance force between the shearing of one rib and the shearing of the next. According to another feature of the invention, each rib extends substantially over half the outer periphery of the cylindrical body and the ribs on the two halves of the body are inclined toward one another to render the deformation force even more uniform.

To avoid having the sheared off ribs fly randomly away during a collision process, it is advantageous to sheath the cylindrical body in the region of the ribs in a shrink foil or a synthetic resin mass which can be cast between the two flanges.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
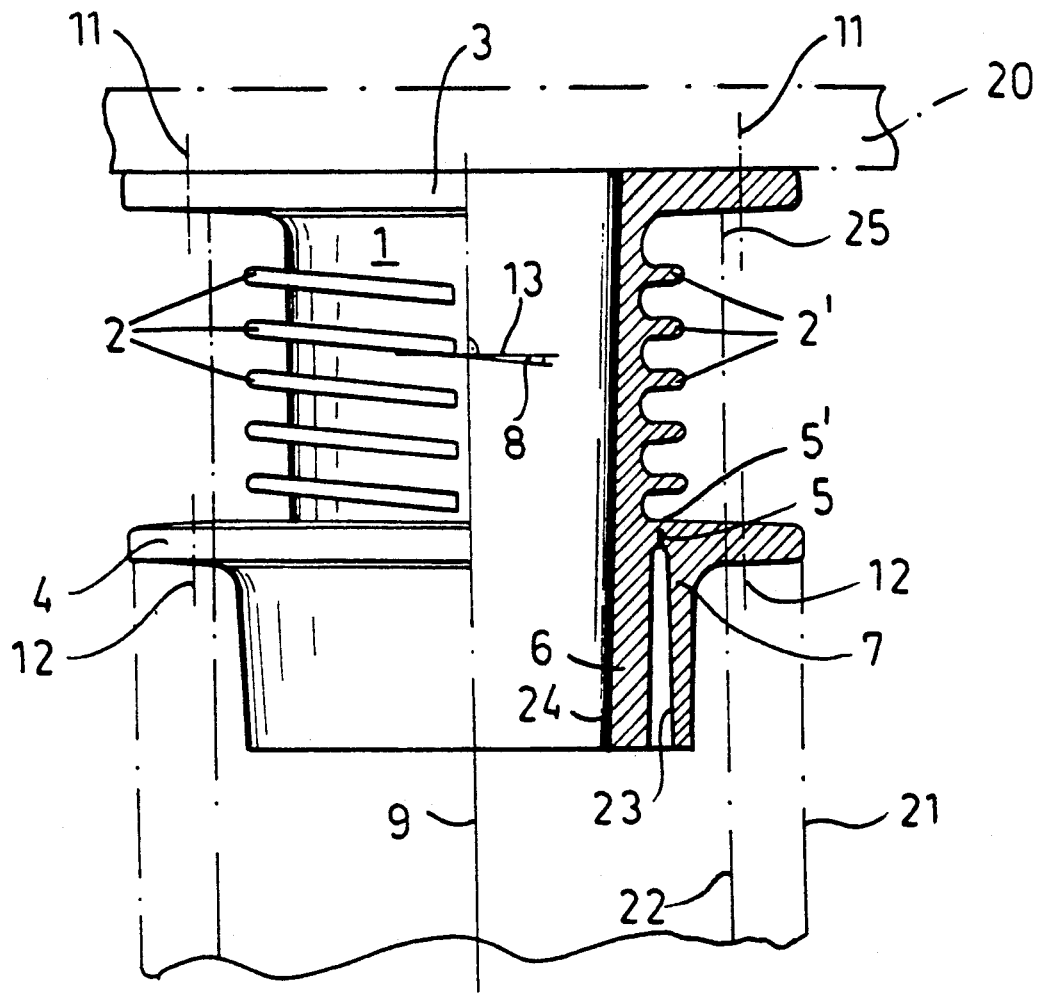
FIG. 1 is an elevational view of an impact absorber according to the invention with the right side being in section in an axial plane.

The impact absorber of FIG. 1 is intended to be mounted between a bumper 20 and a longitudinal girder 21 of the chassis of a motor vehicle, so that the impact absorber extends into the hollow 22 of this longitudinal girder.

The impact absorber comprises a basic body 1 which is cylindrical and has radially projecting ribs 2 and 2' disposed on opposite halves of the periphery, these ribs lying in planes which are inclined to planes normal to the axis of the cylindrical body 1 and formed in one piece therewith. The rib region is bounded on one end by a flange 3 to which the bumper 20 is affixed by bolts extending through bores 11. Member 3, therefore, represents a part of the vehicle which is intended, in a collision, to move toward the chassis with a movement against which a substantially constant resistance is applied.

At the other end, the rib region is bounded by a flange 4 which is also formed in one piece with the body 1, the ribs 2, 2' and the flange 3. The flange 4 is formed on its side turned away from the flange 3 and at its junction with the body 1, with a circumferential groove or notch 5 forming a weakened zone 5' which is intended to tear away an impact so that the flange 4 will separate from the body 1 (see FIG. 3).

The body 1 is provided with an extension 6 along its longitudinal dimension or axis 9 beyond the groove 5 and guided within an annular formation or sleeve 7 formed on the flange 4. This sleeve 7 can have a slight conical divergence downwardly of its inner surface 23 while the inner surface 24 of the cylindrical body can also converge slightly downwardly as shown.

Figure 4:
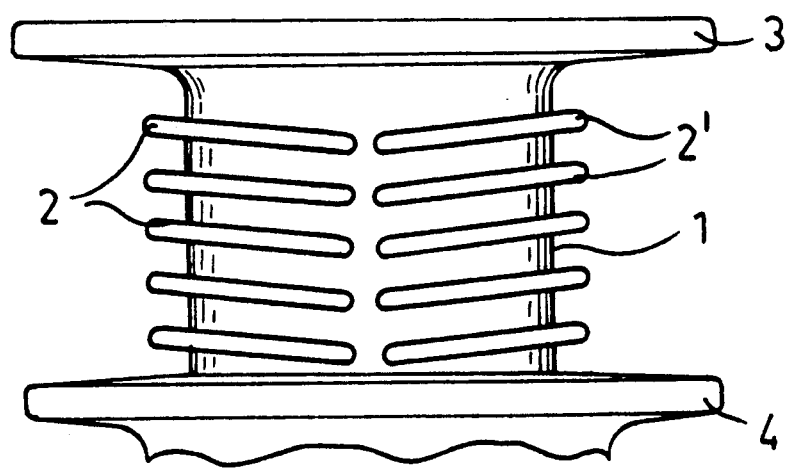
FIG. 4 is a fragmentary elevational view of a portion of the impact absorber of FIG. 1 showing the ribs on opposite sides of the cylindrical body converging toward one another at diametrically opposite locations.

The ribs 2 and 2' extend only over half the outer periphery of the cylindrical body 11, as can be seen from FIG. 4, are inclined toward one another on opposite diametrical sides of the body 1. The spacing of the ribs is such that a successive rib is encountered by the flange 4 upon a collapse of the impact absorber just as a previous rib is fully sheared off. This ensures a substantially uniform deformation force during the collision. A plurality of ribs are provided and the ribs on opposite sides are staggered so that there are always at least two ribs involved in the shearing action.

Bores 12 can connect the flange or bracket 4 to a longitudinal girder 21 as described. In the illustrated embodiment, the bores 11 and 13 are shown to be parallel to the axis 9. Depending upon the orientation of the impact absorber, they may have other angles to the axis 9.

Figure 3:
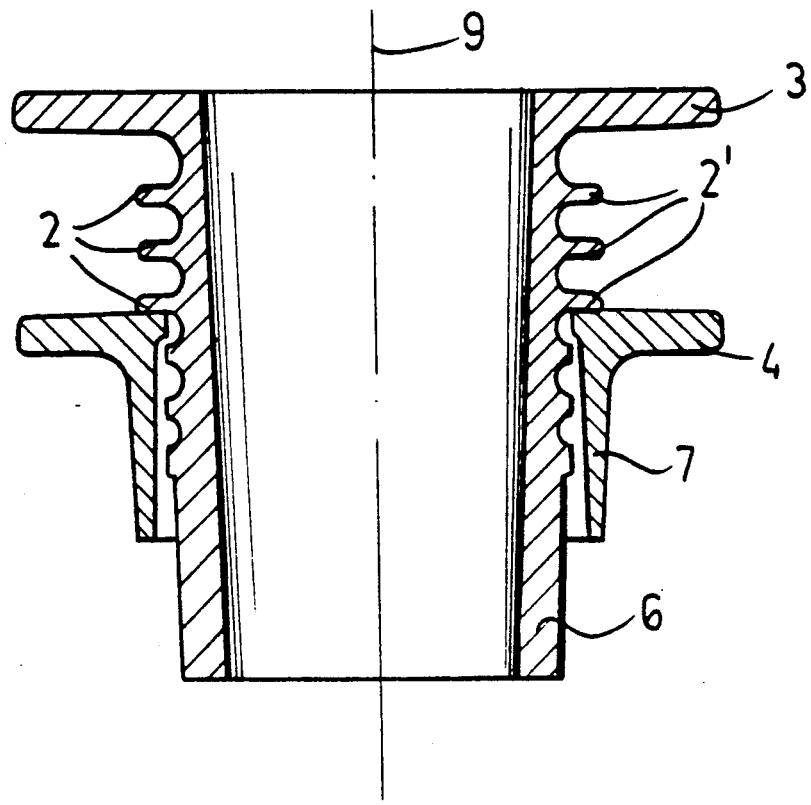
FIG. 3 is an axial section through the impact absorber during a collision process.

As can be seen from FIG. 3, as a collision proceeds, after shearing of the flange 4 from the body 1 at the weakened zone 5', the body 1 telescopes into the flange 4 with progressive shearing of ribs 2 and 2' depending upon the duration of the impact and the force. The collapse is effected with a substantially constant resistance.

A body of synthetic resin represented at 25 can be cast around the rib region to hold the ribs onto the member 1 and prevent sheared off ribs from flying wildly away during the collision. The synthetic resin with which the pieces or rib are held will then extrude outwardly from between the flanges 3 and 4 during the collision process in a more controlled manner.

Figure 2:
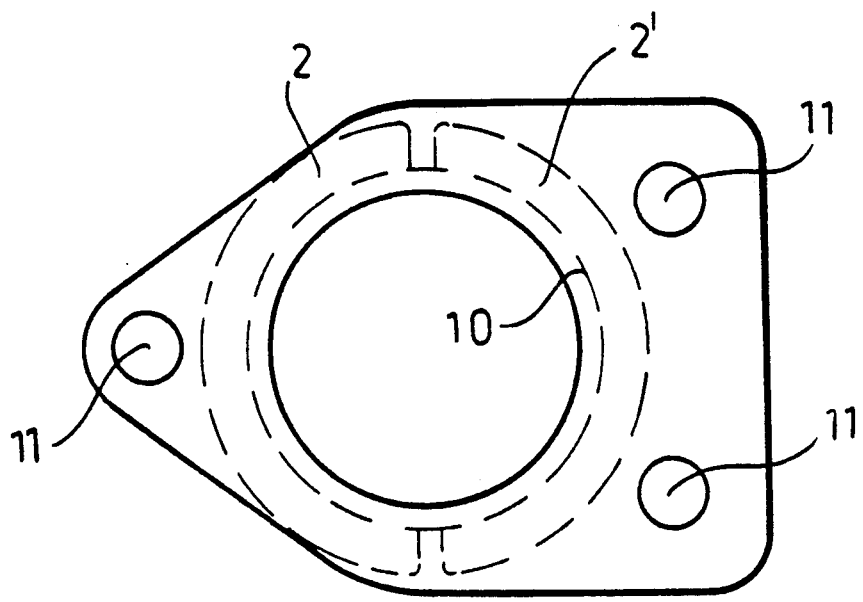
FIG. 2 is a top plan view of the impact absorber of FIG. 1.

The impact absorber of FIGS. 1, 2 and 4 can be cast in one piece from a light metal alloy, preferably aluminum.

I claim:

1. An impact absorber especially for a motor vehicle, comprising:

a generally cylindrical body formed along a region thereof with a plurality of substantially radially extending ribs each extending at least over a portion of the periphery of said body along the rib region thereof;

means formed in one piece with said rib region on said cylindrical body at one end of said region for attachment to a part of a motor vehicle to move relative to another part of the motor vehicle upon impact; and a flange formed on said body at an opposite end of said region and surrounding said body while being connected thereto by a weakened zone for connection to said other part, said flange separating upon impact from said body whereby said body telescopes into said flange and said ribs are sheared against said flange during said impact.

2. The impact absorber defined in claim 1 wherein said flange is connected to said body by a transition region formed with an annular groove on a side of said region turned away from said one end of said region.

3. The impact absorber defined in claim 1 wherein said flange is connected to said body by a transition region formed with an annular notch on a side of said region turned away from said one end of said region.

4. The impact absorber defined in claim 1 wherein said body extends through said flange beyond said weakened zone.

5. The impact absorber defined in claim 4 wherein said flange is formed with an annular formation surrounding said body by said weakened zone.

6. The impact absorber defined in claim 1 wherein said ribs extend at acute angles to planes perpendicular to the longitudinal dimension of said body.

7. The impact absorber defined in claim 1 wherein each of said ribs extends over substantially half the periphery of said body and ribs on opposite halves of said periphery are inclined toward one another.

8. The impact absorber defined in claim 1, further comprising a sheath surrounding said ribs for retaining same against flying off upon shearing of said ribs from said body.

9. The impact absorber defined in claim 1 wherein said body, said ribs, said flange and said means are formed from a cast light metal alloy.

10. The impact absorber defined in claim 9 wherein said light metal alloy is aluminum.

11. The impact absorber in an automotive vehicle in combination:
- a bumper;
- a chassis having at least one girder; and
- an impact absorber connecting said bumper to said girder and formed in one piece of cast aluminum, said impact absorber consisting essentially of:
  - a generally cylindrical tubular body formed at one end with a first transverse flange connected to said bumper,
  - a multiplicity of ribs projecting radially from opposite halves of a periphery of said body along a rib region thereof, each of said ribs being inclined to a plane normal to an axis of said body and extending substantially over half the periphery of the body, the ribs on said halves being inclined toward one another and an end of said region opposite that at which said first flange is provided,
  - a second flange connected to said body by a weakened zone at said end of said region and connected to said chassis, said weakened zone being formed on a side thereof turned away from said first flange with an annular notch, whereby said weakened zone ruptures upon an impact on said bumper and said body telescopes into said second flange causing said ribs to shear off thereagainst in succession,
  - an extension of said body projecting beyond said weakened zone through said second flange, and
  - a sleeve formed on said second flange around said extension and guiding same.

* * * * *